Figure 6:
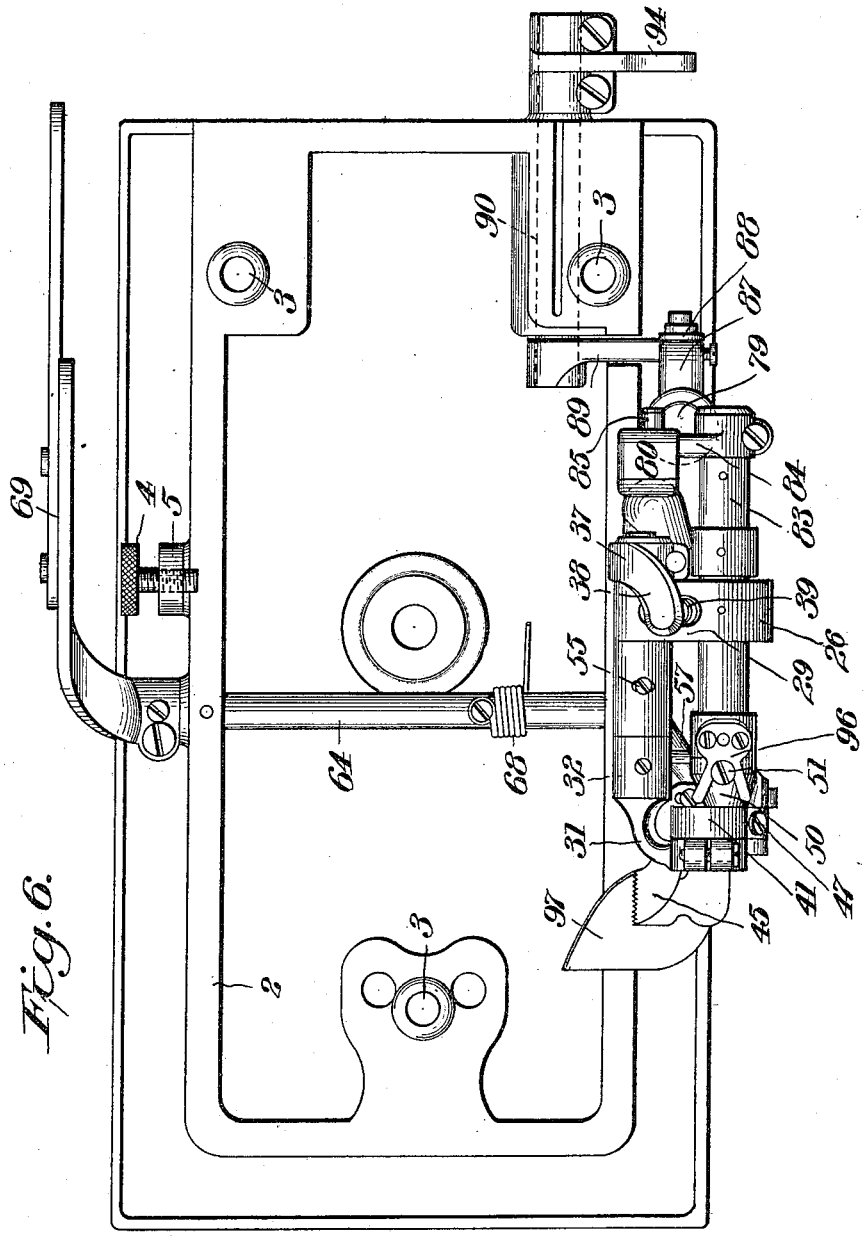

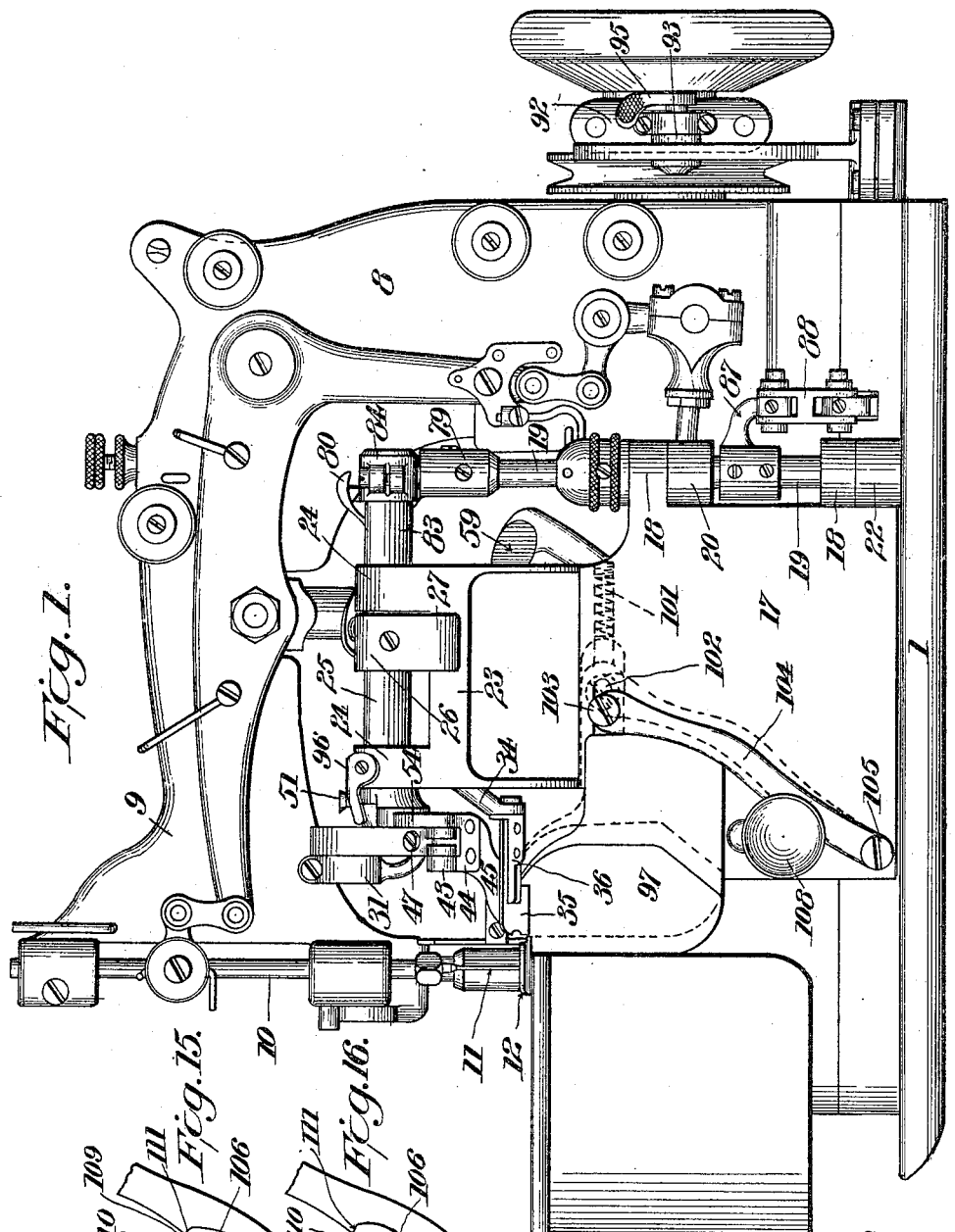

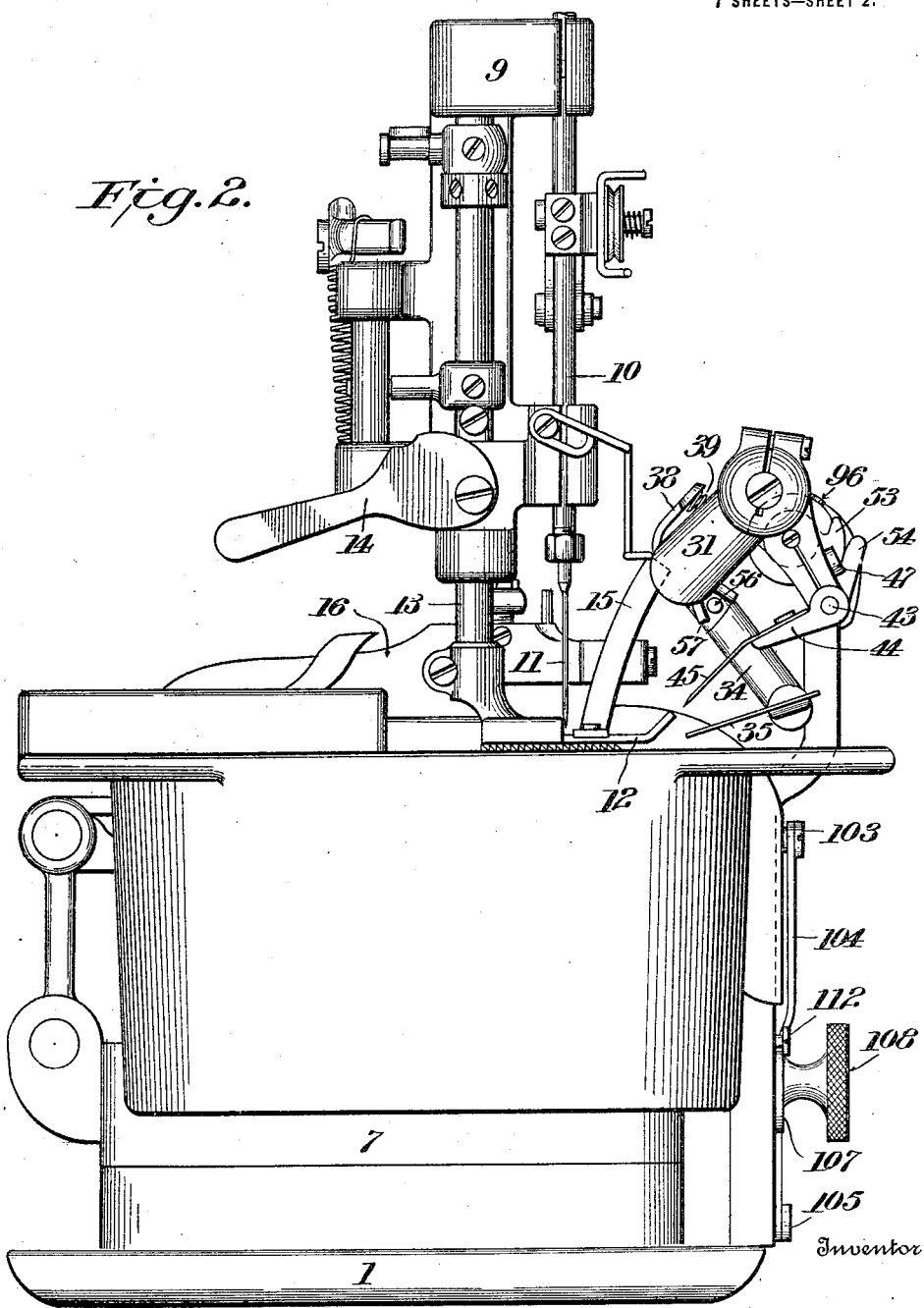

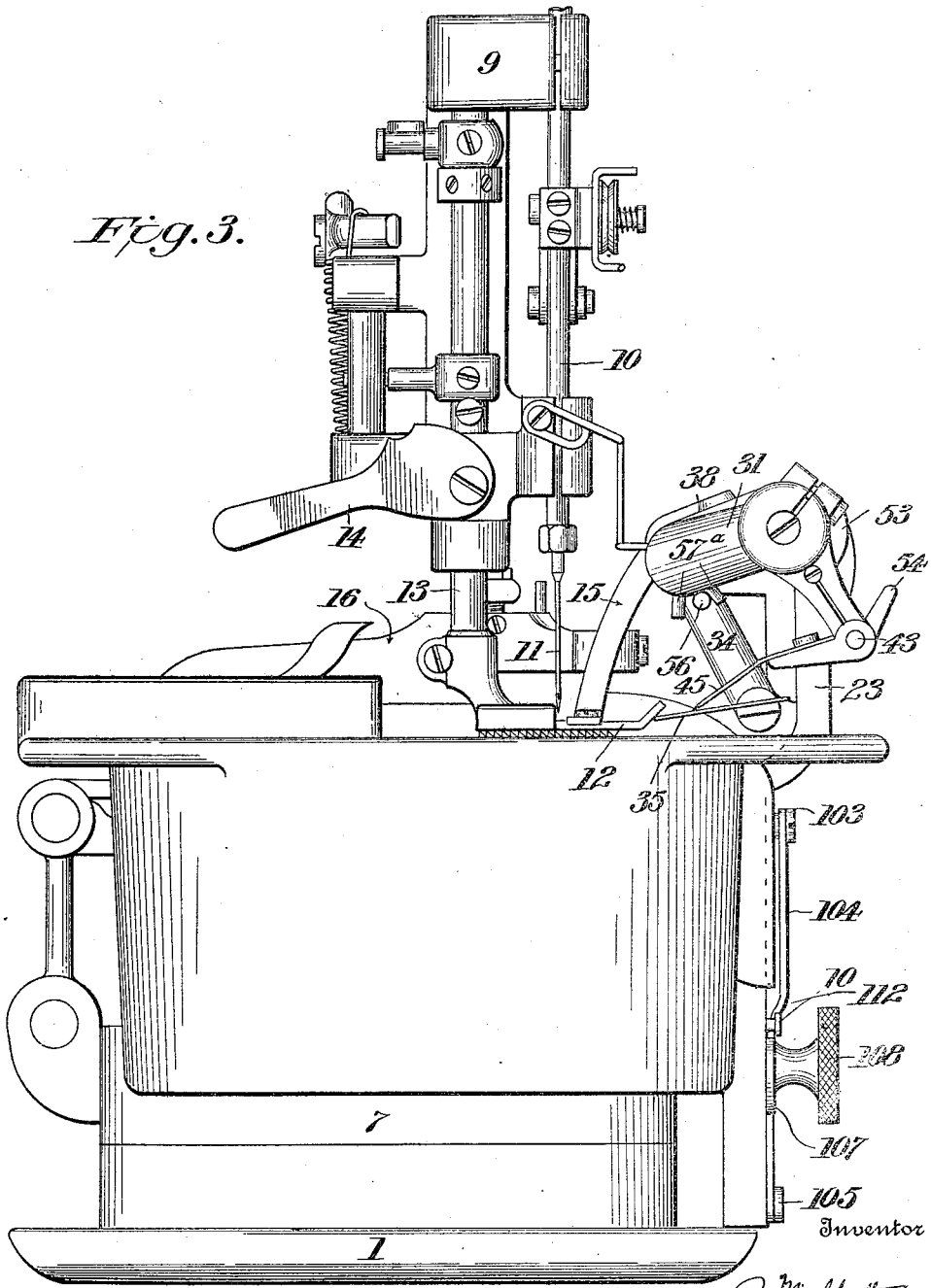

J. R. MOFFATT.
RUFFLING MACHINE.
APPLICATION FILED NOV. 11, 1911.
1,210,671.
Patented Jan. 2, 1917.
7 SHEETS—SHEET 4.
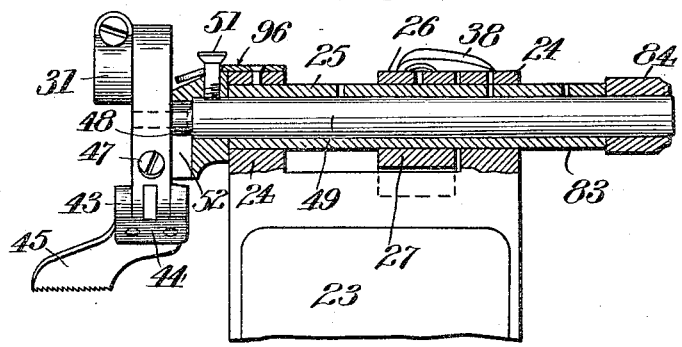
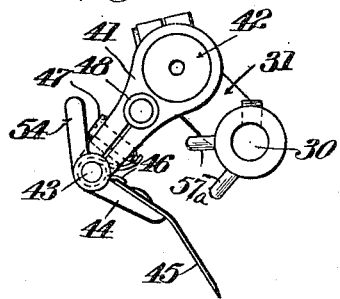
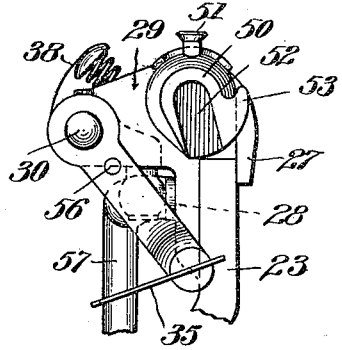
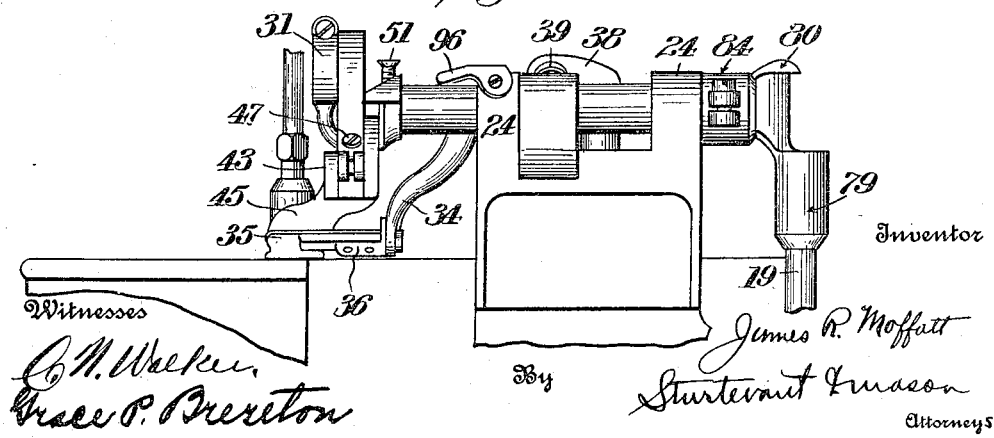
Witnesses
Inventor
James R. Moffatt
By Sturtevant & Mason
Attorneys

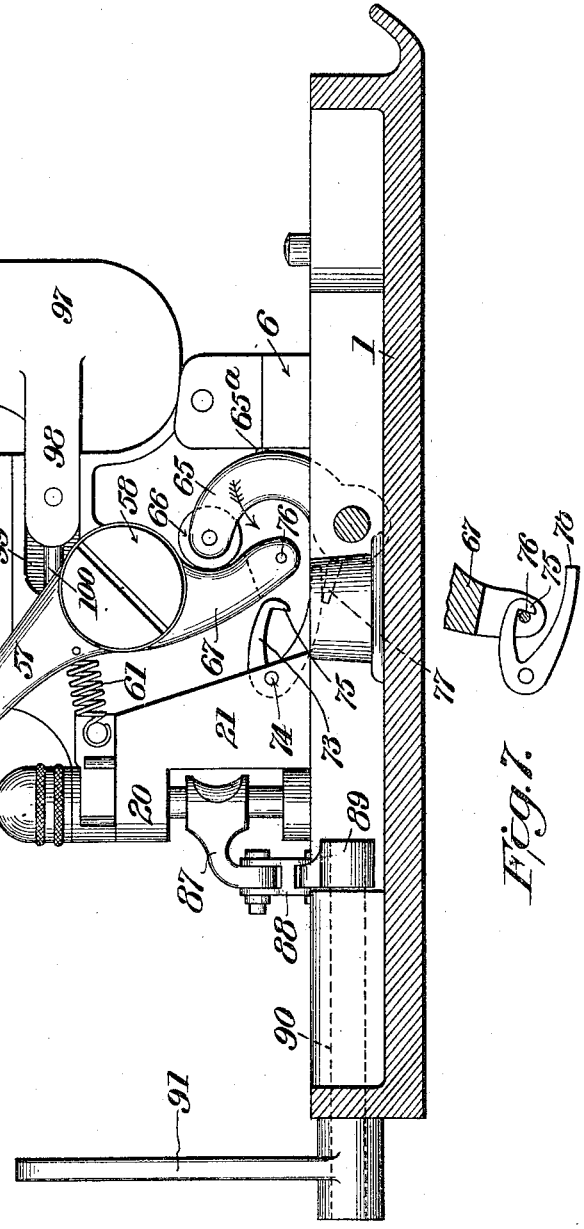

J. R. MOFFATT.
RUFFLING MACHINE.
APPLICATION FILED NOV. 11, 1911.

1,210,671.

Patented Jan. 2, 1917.
7 SHEETS—SHEET 6.

Witnesses
C. N. Walker.
Grace P. Brereton

Inventor
James R. Moffatt,
By Sturtevant & Mason
Attorneys

J. R. MOFFATT.
RUFFLING MACHINE.
APPLICATION FILED NOV. 11, 1911.
1,210,671.
Patented Jan. 2, 1917.
7 SHEETS—SHEET 7.
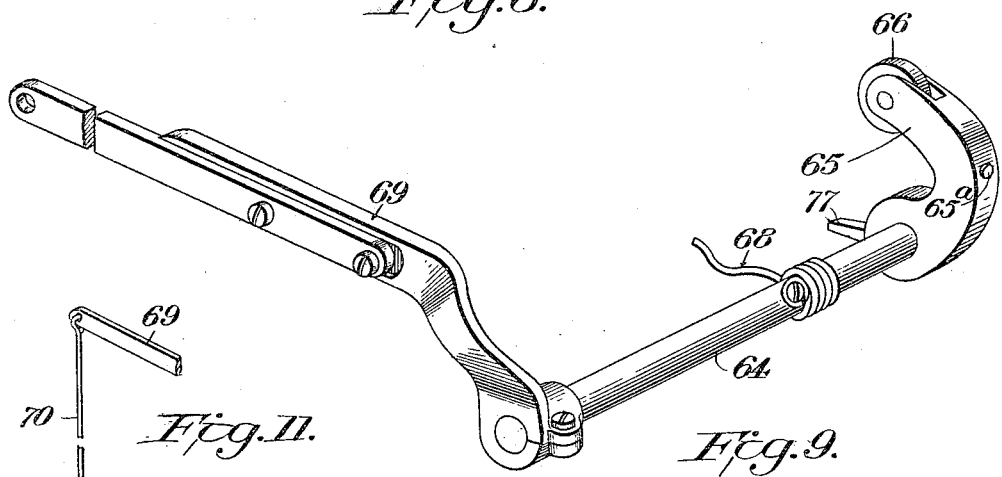
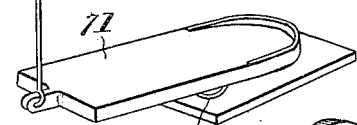
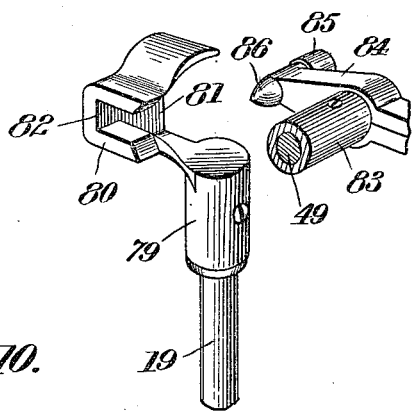
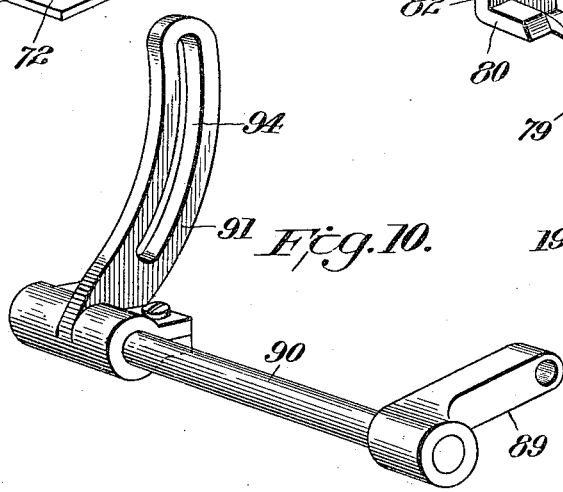
Witnesses
C. H. Walker
Grace P. Brereton
Inventor
James R. Moffatt
By Sturtevant & Mason
Attorneys

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

RUFFLING-MACHINE.

1,210,671.    Specification of Letters Patent.    Patented Jan. 2, 1917.

Application filed November 11, 1911. Serial No. 659,746.

*To all whom it may concern:*

Be it known that I, JAMES R. MOFFATT, a citizen of the United States, residing at Chicago, in the county of Cook, State of Illinois, have invented certain new and useful Improvements in Ruffling-Machines, of which the following is a description, reference being had to the accompanying drawing and to the figures of reference marked thereon.

The invention relates to new and useful improvements in ruffling machines, and more especially to ruffling devices which are adapted to coöperate with a sewing machine and which may be thrown into or out of action during the operation of the sewing machine.

An object of the invention is to provide a ruffling device which shall be complete of itself, and which may be readily attached to a sewing machine without changing to any extent, the parts of the sewing machine.

A further object of the invention is to provide a ruffling mechanism which is automatically thrown into operative position relative to the stitch forming mechanism, and which is withdrawn by manual means, together with devices for locking the throwing-in mechanism so that the parts may be held in operative position with little or no pressure or strain on the mechanical throwing-out devices.

A further object of the invention is to provide a ruffling mechanism which is thrown into inoperative position by the aid of a spring with a latch for restraining the movement of the parts under the influence of the spring, together with a treadle whereby the parts may be thrown into position to be held by the latch on one movement of the treadle, and whereby said latch may be released on another movement of the treadle so as to allow said spring to throw said ruffling parts into ruffling action.

A further object of the invention is to provide a ruffling mechanism which may be thrown into and out of action and also removed from operative position relative to the stitch forming mechanism, with means whereby the ruffler is first rendered inactive and is subsequently moved laterally to inoperative position.

A further object of the invention is to provide a ruffling mechanism which may be thrown into and out of action with a supporting member and an operating member so connected that the supporting member may be moved relative to the operating member to lift the ruffling blade from the material and render the same inactive prior to the moving of the ruffling blade laterally away from the stitch forming mechanism.

A further object of the invention is to provide a supporting bed to which a sewing machine may be attached, which supporting bed is provided with means for supporting and carrying a ruffling mechanism, and to further provide a device of this character wherein the supporting means may be readily swung about a vertical axis relative to the bed, so that access may be had to the parts of the machine in the rear of said support.

These and other objects will in part be obvious, and will in part be hereinafter more fully described.

In the drawings which show by way of illustration one embodiment of the invention, Figure 1 is a front elevation showing a sewing machine having my improved ruffling mechanism connected therewith, and showing in dotted lines the cover plate withdrawn so as to allow the support for the ruffling mechanism to swing to expose the parts in rear thereof, and with the ruffling device held in inoperative position. Fig. 2 is an end view of the same. Fig. 3 is a view similar to Fig. 2 with the ruffling mechanism thrown to operative position. Fig. 4 is a view of certain of the parts shown in Fig. 1, with the ruffling blade moved to operative position. Fig. 5 is a rear side view of the bed and support, and also the parts of the ruffling mechanism carried by the support, the bed being sectioned. Fig. 6 is a top plan view of the same. Fig. 7 is a detail showing the lever for throwing the ruffling parts into and out of action, locked with the parts in action. Fig. 8 is a perspective view showing in detail the pedal-controlled rock shaft for operating the throwing-in and out lever. Fig. 9 is a detached perspective view showing the connection between the operating shaft for the ruffling blade and the reciprocating member operated from the moving parts of the machine. Fig. 10 is a detail in perspective showing the rock shaft for operating the reciprocating member; Fig. 11 is a detail in perspective, showing on a small scale the treadle and connection for throwing the ruffling mechanism in and out. Fig. 12 is a sectional view through the operating shaft for the ruffling blade, and the supporting sleeve and bracket in which these parts are mounted. Fig. 13 is an end view of the arm supporting the ruffling blade, and the arm or support for said first named arm. Fig. 14 is an end view showing the shaft for operating the ruffling blade and also the support for the stripper blade and the upper end of the lever and the connections coöperating therewith for throwing the ruffling blade into and out of action. Fig. 15 is a detail view showing the manner of locking the supporting plate in operative position, relative to the sewing machine. Fig. 16 is a similar view showing the supporting plate released and the stripper guide operating lever thrown by the releasing thumb piece. Fig. 17 is a detail sectional view through the supporting stud for the ruffling head and stripper blade.

In carrying out my invention, I have provided a bed plate 1, which is substantially the same size as the ordinary base plate for sewing machines, and said bed plate 1 carries an upwardly projecting seating rib 2, on which are formed pins 3, 3, adapted to engage pockets formed in the lower face of the base plate of the ordinary sewing machine, so as to hold said base plate in a predetermined position relative to said bed. The base plate of the sewing machine may be further locked to the bed plate of the ruffling mechanism by a set screw 4, which passes through an ear 5 projecting upwardly from the bed plate and the front portion of the base plate of the sewing machine will be thereby clamped against an upwardly projecting ear or lug 6 at the front side of the bed of the ruffling mechanism.

As herein shown, I have mounted a sewing machine on the bed of the ruffling mechanism, which sewing machine includes a supporting bed plate 7 from which rises a standard 8 carrying an overhanging arm 9 in which reciprocates a needle bar 10 carrying the needle 11. A presser foot 12 is carried by the presser bar 13 and may be raised by a hand lever 14 or in any other desired way. A trimmer 15 is carried by an arm or rock shaft 16, and coöperates with a lower trimmer to trim the fabric in advance of the stitching mechanism.

The sewing machine herein shown, is of the type shown in the Onderdonk Patent #962,974, granted June 28th, 1910, and will not need further description in this connection.

Pivoted to the bed plate of the ruffling mechanism is a support 17 which carries ears 18 mounted on a vertically sliding rod 19 which reciprocates in a bearing 20 carried by the bracket 21 (see Fig. 5) and in the bracket 22 formed in the bed plate 1. Said supporting plate 17 carries an upwardly projecting bracket 23, which is formed with spaced supporting arms 24 in which slides a sleeve 25. This sleeve serves as a support for the operating parts of the ruffling mechanism. Rigidly secured to the sleeve 25 is a collar 26 which has a downwardly projecting forked arm 27, one member of which engages the front side of the bracket 23 and the other member 28 of which engages the rear side of the bracket 23. Projecting rearwardly from the collar 26 is an arm 29 in which is mounted to turn freely, a stud 30. On the end of the stud 30 is a supporting arm 31 formed integral with a collar 32 engaging the end of the stud, and the ruffler blade is carried by a ruffler head which is pivoted to said supporting arm 31.

A collar 33 is mounted on the stud 30 between the arm 29 of the collar 26 and the collar 32, which supports the arm 31. This collar 33 carries a supporting arm 34 on which is mounted the stripper blade 35. Said arm 34 extends downwardly and laterally as at 36 and the stripper blade 35 is adjustably secured thereto by suitable screws. A third collar 37 is mounted on the other end of the stud 30 and holds the same in the arm 29, against longitudinal movement therein, but permits said stud to oscillate in said arm. This collar carries an upwardly and laterally projecting arm 38 and a spring 39 engages the under side of said arm 38 which spring is seated in a pocket 40 formed in the upper side of the arm 29. The spring will normally press the arm 38 outwardly, and thus hold the arm 31 carrying the ruffling head raised and in inoperative position. The ruffling head as more clearly shown in Fig. 13, comprises an arm 41 which is pivotally connected to a bearing 42 formed on the outer end of the arm 31. Said arm 41 carries a stud 43 at its lower end on which is mounted a bracket 44 to which is secured by suitable screws, a ruffling blade 45. A spring 46 encircling the stud 43 and engaging at one end a screw 47, normally throws the ruffling blade downward. By adjusting the screw 47 the tension on the spring 46 may be varied. A roller 48 is mounted on a pin between the pivotal point of the ruffler head 41 and the stud 43. Extending through the sleeve 25 is the operating shaft 49 for the ruffling blade. This shaft carries a collar 50 which is secured thereto by a set screw 51. The collar 50 is located alongside of the ruffler head 41 and said collar is enlarged on one side thereof and formed with a radial slot 52 which receives the roller 48.

It will readily be seen that when the stud 30 supporting the arm 31 carrying the ruffling head, is oscillated and the ruffling head moved relative to the oscillating shaft 49, that the roller 48 will be moved toward and from the center of the shaft 49 in the radial slot 52. The spring 39 normally tends to hold the ruffling head with the roller 48 directly in line with the axis of the shaft 49, and in this position, any oscillating movements in the shaft 49 would not impart vibrations to the ruffling head. If however, the stud 30 be swung about its axis so as to move the ruffler head downward, the roller 48 will then be carried away from the axis of the driving shaft and said head will be vibrated about its bearing 42.

The outer face of the collar 50 is curved so as to form a cam shoulder 53. The bracket 44 carrying the ruffling blade has an upwardly extending arm 54 (see Fig. 13) and when the ruffling head is thrown upward to inoperative position, said arm 54 will engage said cam shoulder 53 and raise the ruffling blade from the material as clearly shown in Fig. 2, and when the ruffling head is thrown in the opposite direction, the arm 54 will be moved away from the shoulder 53 and the spring 46 will move the ruffling blade downward into contact with the material or the stripper blade as clearly shown in Fig. 3.

The collar 33 carrying the arm 34 which supports the stripper blade has a limited movement relative to the supporting stud 30, by reason of the slot and screw connection 55 (see Fig. 17). Projecting from the arm 34 is a lug 56 which is positioned between spaced fingers 57ª carried by the collar 31 which supports the ruffling head. It will therefore be seen that when the arm 31 is oscillated with the stud 30, that said fingers will engage said lug 56 and move the arm 34 carrying the separator blade therewith. The purpose of this lost motion between the arm carrying the separator blade and the stud 30 is to allow said stud 30 to be first moved so as to carry the ruffling blade downward into contact with the fabric on the separator blade, and then to move said separator blade and ruffler blade toward the needle together. It will therefore be seen that by an oscillation of the stud 30 I am able to throw the ruffling blade and stripper into and out of operative position relative to the needle of the sewing machine, and further by a sliding of the supporting shaft 49 on which the stud is mounted longitudinally of the bearings for said sleeve, I am able to carry the ruffling head and stripper blade laterally away from the line of stitching.

As a means for oscillating the stud 60 for moving the sleeve laterally, I have provided a lever 57 which is pivotal on a bearing 58 carried at the rear side of the supporting plate 17. Said lever 57 is formed with a cam face 59 at its upper end which engages a ball stud 60 carried by the end of an arm mounted on the collar 37 (see Figs. 5 and 16). When the lever 57 is oscillated so as to bring the cam face 59 into engagement with the ball stud 60, the sleeve 25 will first be slid in the arms 24 until the collar 26 engages one of said arms, which will limit any further movement of the sleeve. This movement of the sleeve positions the ruffling head substantially in the line of feed. A further movement of the lever 57 will cause the cam surface 59 to oscillate the stud 60 which will swing the ruffling head downward, and bring the ruffling blade and the stripper blade into operative position relative to the needle. The lever 57 is swung in the opposite direction by a spring 61.

The end of the lever 57 is provided with a roller carried by a stud 57ᵇ. This roller is on the opposite side of the lever from the cam face 59, as shown in Fig. 5. The member 28 is slotted as indicated at 28ª, a portion of the slot being shown in full lines and a portion of the slot being shown in dotted lines in Fig. 5. This provides a lost motion connection between the lever 57 and the member 28. This member 28 is rigidly connected to the sleeve 25. When the sleeve is positioned so that the ruffling blade is in inoperative position, the parts are as shown in Fig. 5. A movement of the lever 57 to the right at its upper end brings about the movement of the ruffling blade toward the line of feed as above described. A movement of the lever 57 in the opposite direction, through the action of the spring 61, will cause the roller carried by the lever 59 to engage the end of the slot 28ª and move the sleeve to the left, and thus move the ruffling blade away from the line of feed. When the lever 57 is moved to the right at its upper end for the purpose above described, the roller will be carried to the other end of the slot 28ª from that indicated in Fig. 5. As a consequence, the first movement to the left of the lever 57 at its upper end allows the arm 37 to swing, thus raising the ruffling blade through the action of the spring 39, after which the roller engages the end of the slot and moves the ruffling blade away from the line of feed.

The lever 57 is oscillated by a rock shaft 64 (see Fig. 8) which rock shaft carries an arm 65 which is forked at its outer end and supports a roller 66. The lever has a downwardly projecting arm 67 which normally lies in the path of the roller 66 on the rock shaft 64, so that if the rock shaft be moved in the direction of the arrow shown in Fig. 5, the roller will be brought into contact with the arm 67 and the lever 57 swung about its pivotal support and against the tension of the spring 61. The rock shaft 64 is provided with a spring 68 which normally tends to throw the arm 65 of the rock shaft in a direction opposite to that indicated by the arrow in Fig. 5. The rock shaft 64 carries a second arm 69 which is connected by a link 70 with a treadle 71. The treadle 71 is normally pressed upwardly by a spring 72 so that when there is no pressure on the treadle, the arm 69 through the action of the spring 72 and the spring 68, will be normally raised and the roller 66 held out of contact with the arm 67. This allows the spring 61 to normally hold the ruffling head in inoperative position and if the parts are in operative position and the arm 67 of the lever 57 released, the spring 61 will automatically throw the ruffler to inoperative position.

By inoperative position as herein used, I do not necessarily mean that the ruffler blade is disconnected from its operating mechanism, although it is true of the present mechanism, but what I do mean by this term, is that the ruffler blade is moved away from the front of the needle and put out of effective action on the fabric.

From the above description, it will be noted that the ruffling mechanism is thrown into operative position by pressure on the treadle 71 and that this pressure overcomes the pull of the spring 61. In order to relieve the operator from the constant strain of holding the operating parts in action against the tension of the spring 61, I have provided a latch 73 which is pivoted at 74 to the bracket 21 and carries a finger 75 at its outer end. The lower end of the lever 67 is bifurcated and the parts are connected by a pin 76. When the lever 67 is moved so as to carry the ruffling parts to operative position, the pin 76 will ride on the rounded end of the finger 75 and drop behind said finger so that the latch 73 will hold the lever 57 from movement due to the pull of the spring 61.

As a means for releasing the latch 73, I have formed a lug 77 on the arm 65, which oscillates with the rock shaft 64 and this lug 77 engages at certain times, the arm 78 of the latch 73. When the treadle is to be pressed so as to throw the parts into operative position relative to the needle, the latch will engage the lever 67 and hold the same against movement due to the pull of the spring 61. The operator may now release the treadle from excessive pressure and the latch will hold the parts against any pull of the spring 61. It is however, necessary for the operator to hold the treadle depressed, but this only requires sufficient pressure to overcome the pressure of the spring 72 and the spring 68, which are comparatively light and cause little strain on the operator. If the treadle is released so that it may be thrown to its extreme upper position by the spring 72, the rock shaft 64 will then be moved so as to bring the lug 77 into contact with the latch 73 and release the same from the pin 76 so that the spring 61 may automatically throw the ruffler head and the stripper blade to ineffective position. The pin 65$^a$ carried by the lever 65 strikes the lug 6, see Fig. 5, and limits the movement of the lever. When the latch 73 is not engaging the pin 76, it is resting on the lug 77.

As a means for oscillating the shaft 49 so as to impart vibrations to the ruffler blade, I have provided the rod 19 which as above noted, may be reciprocated vertically in the supporting bearings 20 and 22, with means whereby the same may be connected with the shaft 49 when the ruffling parts are in operative position. Said means consists of a collar 79 which has a laterally projecting arm 80 formed with a tapered throat 81 leading to a bearing slot 82. On the outer end of the shaft 49, is a fixed collar 83 carrying an arm 84 in which is mounted a stud carrying a roller bearing 85. Said stud at the end opposite the roller 85 is tapered as at 86.

The rod 19 is reciprocated in its supporting bearings by an arm 87 which is connected through the link 88 with a second arm 89 on the rock shaft 90. The rock shaft 90 is mounted in suitable bearings in the bed of the ruffling mechanism (see Fig. 6) and carries at its upper end a curved slotted arm 91. On the end of the main shaft of the sewing machine is an eccentric with which coöperates an eccentric strap 92. A stud 93 is mounted in the curved slot 94 of the arm 91, and the eccentric strap 92 engages the same and serves as a means for oscillating said arm and through the rock shaft 90 and link connection 88 imparts to the rod 19 a vertical reciprocation.

The finger-piece 95 serves as a means for quickly releasing the stud 93 so that it may be adjusted to various positions in the slot 94 (see Fig. 10) and thus vary the reciprocating stroke of the rod 19, and in turn the amount of vibration given to the ruffling blade. When the sleeve 25 carrying the ruffling parts is moved to the position shown in Fig. 1, the arm 84 will be moved away from the reciprocating position of the rod 19, and the roller bearing 85 brought out of the bearing slot 82 which will disconnect the shaft 49 from the reciprocating rod 19. When the sleeve is moved in the opposite direction through the action of the lever 57, the tapered stud 86 will enter the tapered throat in the arm 80 and move through the slot 82 carrying the bearing roller 85 into operative engagement with said slot 82 so that the reciprocations of the rod 19 will be imparted to the shaft 49.

In order that the shaft 49 may be held with the arm 84 in a fixed predetermined position when disconnected from the reciprocating rod 19, I have formed a V-shaped bracket 96 which is mounted on the arm 24 and projects laterally over the collar on the end of the shaft 49 when the parts are in inoperative position. A screw 51 projects above the collar 50 and when the sleeve 25 is moved to the right as viewed in Fig. 1, said screw 51 will be carried between the projecting arms to the bracket 96 formed by the V-shaped slot therein and said arms will hold the shaft 49 with the arm 84 in a fixed position when said shaft is moved so as to disconnect the arm from the reciprocating rod 19.

Mounted on the supporting plate 17 is a strip guide 97 (see Fig. 1). This strip guide serves as a cover plate for the parts of the stitching mechanism adjacent the stitching point in the manner shown in the Onderdonk patent above referred to, and deflects the trimmed-off strip away from the stitching mechanism. In order that this strip guide 97 may be moved out of contact with the work support and lower stationary trimmer so that the plate 17 may be swung about its pivotal connection with the rod 19, I have provided means for slidingly mounting said strip guide. Said means consists as herein shown of a projecting arm 98, which slides in a groove 99 formed in a rib on the back of the plate 17. Said arm carries a rod 100 which slides in a suitable opening formed in the plate 17.

A spring 101 (see Fig. 1) engages the end of the rod 100 and normally presses the strip guide 97 outward so as to yieldingly force the same in contact with the work support. The front of the plate 17 is slotted as at 102, and a screw 103 is threaded into the arm 98. A lever 104 is pivoted at 105 to the plate 17 and is forked at its upper end so as to engage the screw 103. Said lever 104 is formed with a cam face 106 adapted to be engaged by the base 107 of the thumb screw 108. Said base is slabbed on one side so as to form a flat face 109. A pin 110 (see Figs. 15 and 16) serves as a stop for limiting the rotation of the thumb screw 108. The cam face 106 terminates in a shoulder 111 which limits the movement of the thumb screw in the opposite direction. When the parts are in the position shown in Fig. 15, the spring 101 will force the strip guide against the work support. When the thumb screw 108 is turned to the position shown in Fig. 16, the lever 104 will be forced to the dotted line position shown in Fig. 1, thus withdrawing the strip guide from contact with the work support, and parts adjacent the stitching point so that the plate 17 with the ruffling mechanism supporting thereon, may be swung about the vertical rod 19 as an axis carrying all of the ruffling parts away from the movable parts of the sewing machine in rear thereof so that access may be readily had to the under thread-carrying looper or loopers, for the purpose of threading or for any other purpose.

In order to hold the swinging plate in closed position, I have formed an opening through which projects a stud 112 which stud is mounted in the lug 6 on the bed of the ruffling mechanism. This stud adjacent its outer end is formed with a groove adapted to receive the base 107 of the thumb screw 108. When the parts are in the position shown in Fig. 16, the thumb screw will be released from the stud 112 and as the strip guide is now moved away from the work support, the plate 17 is free to swing about its axis. When the thumb screw 108 is moved to the position shown in Fig. 15, the base 107 will engage the groove 112 and lock the plate 17 against the lug 6 on the bed of the ruffling mechanism.

From the above description, it will be readily seen that I have provided a ruffling device which may be said to be self contained and which may be readily attached to various types of sewing machines, without requiring any change in the sewing machine. The sewing machine to which the ruffling mechanism is to be attached is placed on the ruffling bed and secured thereto. An eccentric is placed on the end of the main shaft, if said shaft is not already equipped therewith, and connection made between said eccentric and the rock shaft which vibrates the ruffling mechanism.

After the ruffling mechanism is attached to the machine, it may be readily manipulated by the operator without stopping the stitching mechanism, so that said ruffling mechanism may be rendered effective to ruffle or rendered ineffective and moved entirely away from the stitching point, so that free access may be had to the material being stitched. The throwing of the ruffling mechanism into action, is manually accomplished through the depressing of the treadle. This operates through the lever 57 to swing the stud 30 and the supporting shaft for the ruffling member about its axis so as to carry its ruffling head downward, and move the ruffling blade in the direction of its length, and also to move the support for the ruffling member and the operating shaft longitudinally, so as to bring the ruffling member into operative position relative to the needle. The latch 75 will engage the lever 57 and hold the parts in ruffling position until said latch is released so that no excessive pressure on the part of the operator is necessary to hold the parts in action.

When the treadle is released sufficiently so that the spring raises the same, the latch will be released from the lever 57 and said lever through the action of the spring 61 will throw the ruffling mechanism automatically into inoperative position, first swinging the ruffling head upward, thus withdrawing the ruffling blade directly away from the needle and throwing the same out of action and then through the longitudinal movement of the spring 25 carrying the ruffling head way from the line of feed.

While I have used the terms "operative" and "inoperative" to indicate the position of the ruffler relative to the needle when it is operating upon the material and when it is removed from action on the material, it is to be understood that I do not necessarily mean by this expression that the ruffling member is inactive. In other words, when moved away from the needle, the ruffling member may from certain aspects of the invention, be merely out of contact with the material, and not wholly inactive, and I therefore, desire to be understood that this term "inoperative" covers either an inactive or ineffective position of the ruffling member. Furthermore, it will be readily understood that in the place of a ruffling blade, I may use a ruffling foot and that the throw of the ruffling blade or foot may be such as to ruffle the material or slightly gather the material, or merely sufficient to prevent the stretching of the material if operating upon elastic knit goods.

It is obvious that minor changes in the details of construction may be made without departing from the spirit of my invention as set forth in the appended claims.

Having thus particularly described my invention, what I claim as new and desire to secure by Letters Patent, is:—

1. A ruffling machine including in combination, a ruffling member, means for operating said ruffling member, means for rendering said ruffling member inactive without stopping the machine, and for subsequently moving it laterally to inoperative position.

2. A sewing machine including in combination, stitch forming mechanism, a ruffling member adapted to engage the material in advance of the stitch forming mechanism, means for reciprocating said ruffling member, and means for moving said ruffling member bodily transversely of the path of reciprocation and in the direction of its length to inoperative position.

3. A sewing machine including in combination, stitch forming mechanism, a needle, a ruffling member, means for operating the ruffling member, means for manually moving said ruffling member laterally to a point in front of the needle, then forwardly in the direction of length of the ruffling member into operative relation with the needle, and automatic means under the control of the operator for moving said ruffling member laterally and in the direction of its length, to inoperative position.

4. A sewing machine including in combination, stitch forming mechanism including a needle, a ruffling member, means for operating the ruffling member, means for manually moving said ruffling member laterally and thence forwardly in the direction of the ruffling member, whereby said ruffling member is brought into operative relation relative to the needle and into active connection with the operating means.

5. A sewing machine including in combination, stitch forming mechanism including a needle, a ruffling member, means for operating the ruffling member, means for manually moving said ruffling member laterally and thence forwardly in the direction of the ruffling member, whereby said ruffling member is brought into operative relation relative to the needle, and into active connection with the operating means, and automatic means under the control of the operator for moving said ruffling member laterally and in the direction of its length, to inoperative position.

6. A ruffling machine including in combination, a ruffling member, an arm for supporting the same, a support for said arm, an operating shaft located at one side of said support, said operating shaft having a radially slotted head engaging an operating member on the arm supporting the ruffling member, and means for moving said support so as to move the operating member on the arm supporting the ruffling member, toward and from the center of the operating shaft, for varying the throw of the ruffling member, or for rendering the same inactive.

7. A ruffling machine including in combination, a ruffling member, an arm for supporting the same, a support for said arm, an operating shaft located at one side of said support, said operating shaft having a radially slotted head engaging an operating member on the arm supporting the ruffling member, means for moving said support so as to move the operating member on the arm supporting the ruffling member toward and from the center of the operating shaft, for varying the throw of the ruffling member or for rendering the same inactive, and means for raising the ruffling member from the material when said operating member is moved to inactive position.

8. A ruffling machine including in combination, a ruffling member, an arm for supporting the same, a support for said arm, an operating shaft located at one side of said support, said operating shaft having a radially slotted head engaging an operating member on the arm supporting the ruffling member, and means for moving said support so as to move the operating member on the arm supporting the ruffling member toward and from the center of the operating shaft, for varying the throw of the ruffling member or for rendering the same inactive, and means for moving said support and said operating shaft laterally, to carry the ruffling member to and from inoperative position.

9. A sewing machine including in combination, a needle, a ruffling member, an arm pivotally supporting said ruffling member, a spring for normally holding the ruffling member in contact with the material, a support for said arm, an operating arm located at one side of said support, and having a radially slotted head, a roller carried by said ruffling member supporting arm and adapted to engage said slot, and means for oscillating said support for moving the ruffling member away from or toward the needle and for moving said roller toward and from the center of the operating shaft, whereby as said ruffling member is moved away from the needle, the same may be rendered inactive.

10. A sewing machine including in combination, stitch forming mechanism including a needle, a ruffling member, an arm pivotally supporting said ruffling member, a spring for normally holding the ruffling member in contact with the material, a support for said arm, an operating arm located at one side of said support and having a radially slotted head, a roller carried by said ruffling member supporting arm and adapted to engage said slot, means for oscillating said support for moving the ruffling member away from or toward the needle, and for moving said roller toward and from the center of the operating shaft, whereby as said ruffling member is moved away from the needle, the same may be rendered inactive, and a cam for engaging the ruffling member and for raising the same from the material as it is moved to inactive position.

11. A sewing machine including in combination, a ruffling member, an arm pivotally supporting said ruffling member, a spring for normally holding the ruffling member in contact with the material, a support for said arm, an operating arm located at one side of said support and having a radially slotted head, a roller carried by said ruffling member supporting arm and adapted to engage said slot, means for oscillating said support for moving the ruffling member away from or toward the needle, and for moving said roller toward and from the center of the operating shaft, whereby as said ruffling member is moved away from the needle, the same may be rendered inactive, a stripper blade freely mounted on the support for the ruffling member, and means for moving said stripper blade toward and from the needle in the direction of the length of said stripper blade.

12. A sewing machine including in combination, stitch forming machanism, including a needle, a ruffling member, an arm pivotally supporting said ruffling member, a spring for normally holding the ruffling member in contact with the material, a support for said arm, an operating arm located at one side of said support and having a radially slotted head, a roller carried by said ruffling member supporting arm and adapted to engage said slot, and means for oscillating said support for moving the ruffling member away from or toward the needle and for moving said roller toward and from the center of the operating shaft, whereby as said ruffling member is moved away from the needle, the same may be rendered inactive, a cam for engaging the ruffling member and for raising the same from the material as it is moved to inactive position, a stripper blade, an arm rigidly supporting said stripper blade, said arm being freely mounted on said support for the ruffling member, and means for moving said stripper supporting arm as the support is moved, for carrying the stripper blade toward and away from the needle.

13. A sewing machine including in combination, stitch forming mechanism, a needle, a ruffling member, a support for said ruffling member, means for oscillating said ruffling member, means for moving said ruffling member to support for carrying the ruffling member to inoperative position, a stripper blade, an arm supporting said stripper blade, said arm being freely mounted on the support for the ruffling member, a stud carried by said arm, spaced projections carried by the support for the ruffling member for engaging said stud, to move the stripper blade toward and from the needle when the ruffling member is moved toward and from operative position.

14. A sewing machine including in combination, a ruffling member, an arm supporting said ruffling member, a supporting shaft for said arm, an operating shaft for oscillating said arm, said oscillating shaft being located at one side of and parallel with the supporting shaft, and means for connecting said shafts, whereby they may be moved longitudinally to carry the ruffling member in a lateral direction toward and from the needle.

15. A sewing machine including in combination, a ruffling member, an arm supporting said ruffling member, a supporting shaft for said arm, an operating shaft for oscillating said arm, said oscillating shaft being located at one side of and parallel with the supporting shaft, and means for connecting said shafts whereby they may be moved longitudinally to carry the ruffling member in a lateral direction toward and from the needle, and means for oscillating said supporting shaft for moving the ruffling member in the direction of its length toward and from operative position relative to the needle.

16. A sewing machine including in combination, a ruffling member, an arm supporting said ruffling member, a supporting shaft for said arm, means for oscillating said arm on said supporting shaft, a second arm connected to said supporting shaft, a lever for engaging said second arm for oscillating the supporting shaft to move the ruffling member in the direction of its length toward and from the needle, said lever having means for engaging and moving said supporting shaft longitudinally.

17. A sewing machine including in combination, stitch forming mechanism including a needle, a ruffling member, an arm carrying said ruffling member, a supporting shaft for said arm, an operating shaft parallel with said supporting shaft, means for connecting said operating shaft to said arm, a second arm carried by said supporting shaft, a lever having a cam face, a spring for normally holding said second arm in contact with the cam face on said lever, a bracket for moving said operating shaft and said supporting shaft longitudinally, said bracket having a slot formed therein, and a roller carried by said lever and located in said slot for engaging and moving said bracket.

18. A ruffling machine including in combination, a ruffling member, an arm for supporting said ruffling member, an oscillating shaft for operating said arm, a reciprocating member arranged in a plane at right angles to the axis of the operating shaft, a yoke bracket carried by said reciprocating member, and an arm carried by said operating shaft adapted to engage said yoke bracket, whereby the reciprocations of said member will oscillate said operating shaft.

19. A ruffling machine including in combination, a ruffling member, an arm for supporting said ruffling member, an oscillating shaft for operating said arm, a reciprocating member arranged in a plane at right angles to the axis of the operating shaft, a yoke bracket carried by said reciprocating member, and an arm carried by said operating shaft adapted to engage said yoke bracket, whereby the reciprocations of said member will oscillate said operating shaft, and means for moving said operating shaft longitudinally or disconnecting the same from said reciprocating member.

20. A ruffling machine including in combination, a ruffling member, an arm for supporting said ruffling member, an oscillating shaft for operating said arm, a reciprocating member arranged in a plane at right angles to the axis of the operating shaft, a yoke bracket carried by said reciprocating member and an arm carried by said operating shaft adapted to engage said yoke bracket whereby the reciprocations of said member will oscillate said operating shaft, means for moving said operating shaft longitudinally for disconnecting the same from said reciprocating member, and means for engaging said operating shaft when disconnected from its operating means, for holding the same in predetermined relation relative to the reciprocating member.

21. A ruffling machine including in combination, a ruffling member, an arm for supporting said ruffling member, an oscillating shaft for operating said arm, a reciprocating member arranged in a plane at right angles to the axis of the operating shaft, a yoke bracket carried by said reciprocating member, and an arm carried by said operating shaft adapted to engage said yoke bracket, whereby the reciprocations of said member will oscillate said operating shaft, means for moving said operating shaft longitudinally for disconnecting the same from said reciprocating member, a stud carried by said shaft and a stationary forked bracket for engaging said stud and holding the operative shaft in predetermined position when disconnected from the reciprocating member.

22. A ruffling machine including in combination, a ruffling member, an arm supporting the same, an operating shaft having a radially slotted head, a roller carried by said arm and engaging said slotted head, a support for the arm at one side of said shaft, means for operating said support for varying the throw of the ruffling arm or for rendering the same inactive, means for oscillating said operating shaft including a reciprocating member moving in a plane substantially at right angles to the axis of the operating shaft, a forked bracket carried by said reciprocating member, an arm carried by said operating shaft and adapted to engage said forked bracket.

23. A ruffling machine including in combination, a ruffling member, an arm supporting the same, an operating shaft having a radially slotted head, a roller carried by said arm and engaging said slotted head, a support for the arm at one side of said shaft, means for operating said support for varying the throw of the ruffling arm or for rendering the same inactive, means for oscillating said operating shaft including a reciprocating member moving in a plane substantially at right angles to the axis of the operating shaft, a forked bracket carried by said reciprocating member, an arm carried by said operating shaft and adapted to engage said forked bracket, and means for moving said support and said operating shaft longitudinally to disconnect said longitudinal shaft from said reciprocating member.

24. A ruffling machine including in combination, a ruffling member, an arm supporting the same, an operating shaft having a radially slotted head, a roller carried by said arm and engaging said slotted head, a support for the arm at one side of said shaft, means for operating said support for varying the throw of the ruffling arm or for rendering the same inactive, means for oscillating said operating shaft including a reciprocating member moving in a plane substantially at right angles to the axis of the operating shaft, a forked bracket carried by said reciprocating member, an arm carried by said operating shaft and adapted to engage said forked bracket, means for moving said support and said operating shaft longitudinally to disconnect said longitudinal shaft, from said reciprocating member, and means for holding said operating shaft in a predetermined position relative to the reciprocating member when disconnected therefrom.

25. A sewing machine including in combination, a ruffling member, means for oscillating said ruffling member, automatic means for moving said ruffling member bodily transversely of its path of oscillation to inoperative position, means under the control of the operator for holding said ruffling member in operative position and against the operative force of said automatic means.

26. A ruffling machine including in combination, a ruffling member, means for operating said ruffling member, a lever for moving said ruffling member bodily laterally of itself into and out of operative position, a spring for moving the lever in one direction, a latch for holding said lever from movement by said spring, and means for releasing said latch.

27. A ruffling machine including in combination, a ruffling member, means for operating said ruffling member, a lever for moving said ruffling member into and out of operative position, a spring for moving the lever in one direction, a latch for holding said lever from movement by said spring, a rock shaft for moving the lever against the tension of the spring, said rock shaft having a lug to trip said latch when moved in the opposite direction.

28. A ruffling machine including in combination, a ruffling member, means for operating said ruffling member, a lever for moving said ruffling member into and out of operative position, a spring for moving the lever in one direction, a latch for holding said lever from movement by said spring, a rock shaft for moving the lever against the tension of the spring, said rock shaft having a lug to trip said latch when moved in the opposite direction, and a treadle for operating said rock shaft.

29. A sewing machine including in combination, stitch forming mechanism, a needle, a ruffling member, means for operating said ruffling member, means for moving said ruffling member to and from operative position relative to the needle, said means including a lever, a spring for moving the lever in one direction, and a latch for holding said lever from movement by said spring, and manually controlled means for releasing the latch.

30. A sewing machine including in combination, stitch forming mechanism, a needle, a ruffling member, means for operating said ruffling member, means for moving said ruffling member to and from operative position relative to the needle, said means including a lever, a spring for moving the lever in one direction, a latch for holding said lever, a rock shaft having an arm adapted to engage said lever for moving the same against the tension of the spring, and a stud for engaging the latch to release the same when said rock shaft is moved in the opposite direction.

31. A sewing machine including in combination, stitch forming mechanism, a needle, a ruffling member, means for operating said ruffling member, means for moving said ruffling member to and from operative position relative to the needle, said means including a lever, a spring for moving the lever in one direction, a latch for said lever, a rock shaft having an arm adapted to engage said lever for moving the same against the tension of the spring, a stud for engaging the latch to release the same when said rock shaft is moved in the opposite direction, and a treadle for oscillating said rock shaft.

32. A sewing machine including in combination, stitch forming mechanism including a needle, a ruffling member, means for operating said ruffling member, means for moving said ruffling member to and from operative position including a lever, a spring for moving the lever in one direction, a latch for locking said lever from movement by the spring, said latch having a finger for engaging a pin on the lower end of said lever, and a releasing arm extending underneath the lower end of said lever, a rock shaft having a curved arm carrying a roller for engaging said lever for moving the same against the tension of the spring when said rock shaft is moved from one direction, and a stud for engaging the arm on the latch for releasing the latch when said rock shaft is moved in the opposite direction.

33. A sewing machine including in combination, stitch forming mechanism, including a needle, a ruffling member, means for operating said ruffling member, means for moving said ruffling member to and from operative position, including a lever, a spring for moving the lever in one direction, a latch for locking said lever from movement by the spring, said latch having a finger for engaging a pin on the lower end of said lever, a releasing arm extending underneath the lower end of said lever, a rock shaft having a curved arm carrying a roller for engaging said lever in moving the same against the tension of the spring when said rock shaft is moved from one direction, a stud for engaging the arm on the latch for releasing the latch when said rock shaft is moved in the opposite direction, and a treadle for oscillating said rock shaft.

34. A ruffling machine including in combination, a supporting bed having means for attaching a sewing machine thereto, a ruffling mechanism, a support carried by said bed on which said ruffling mechanism is mounted, said ruffling mechanism including a ruffling member, a support therefor, an operating shaft, a vertically reciprocating member for operating said shaft, a rock shaft mounted in said supporting bed, and means for connecting said reciprocating member to said horizontal rock shaft.

35. A ruffling machine including in combination, a supporting bed, a ruffling member, an operating shaft for said ruffling member, a support for said ruffling member and operating shaft, a reciprocating pivot rod for connecting said support to said supporting bed, means for connecting said reciprocating pivot rod to said operating shaft, and means whereby said pivot rod may be reciprocated.

36. A ruffling machine including in combination, a supporting bed, a ruffling member, an operating shaft for said ruffling member, a support for said ruffling member and operating shaft, a reciprocating pivot rod for connecting said support to said supporting bed, means for connecting said reciprocating pivot rod to said operating shaft, means whereby said pivot rod may be reciprocated, a rock shaft mounted in said supporting bed, and having a link connection with said pivot rod for reciprocating the same.

37. A ruffling machine including in combination, a supporting bed, a ruffling mechanism, a support therefor pivotally connected to said supporting bed, a strip guide carried by said support, a spring for moving said strip guide outward from said support, means for moving said strip guide inward against said spring, including a lever, and a thumb screw having means for engaging and moving said lever.

38. A ruffling machine including in combination, a supporting bed, a ruffling mechanism, a support therefor pivotally connected to said supporting bed, a strip guide carried by said support, a spring for moving said strip guide outward from said support, means for moving said strip guide inward against said spring, including a lever, and a thumb screw having means for engaging and moving said lever, said thumb screw having means for locking said support in closed position.

39. A ruffling machine including in combination, a supporting bed, a ruffling mechanism, a support therefor pivotally connected to said supporting bed, a strip guide carried by said support, a spring for moving said strip guide outward from said support, means for moving said strip guide inward against said spring, including a lever, and a thumb screw having means for engaging and moving said lever, said thumb screw having means for locking said support in closed position, a stop for limiting the movement of the thumb screw in one direction, and a shoulder formed on said lever for limiting the movement of the thumb screw in the opposite direction.

40. In a sewing machine, the combination of stitch-forming mechanism including a needle, a ruffling mechanism including a ruffling member, means for operating said ruffling member, means for manually moving said ruffling member laterally in a raised position, and for moving it downwardly in contact with the fabric, whereby said ruffling member is carried above the fabric to be ruffled and subsequently moved into contact with it.

41. In a sewing machine, the combination of stitch forming mechanism and a ruffling mechanism including a movable member, means for operating the same, means to move said member from a point outside into the sewing line, additional means brought into action by the moving means to give said member a second movement, and automatic means to restore the parts to their initial position.

42. The combination of a stitch forming mechanism, and a ruffling mechanism including a ruffling member, a single lever, and mechanism operated thereby for moving said ruffling member laterally into the stitching line, downwardly and forwardly into contact with the fabric.

43. In a sewing machine, the combination of a ruffling mechanism including a ruffling member, a single lever and mechanism operated thereby for moving said ruffling member laterally into the stitching line, downwardly and forwardly into contact with the fabric, and automatic means for moving said ruffling member backwardly, upwardly and laterally to inoperative position.

44. In a sewing machine, the combination of stitch-forming mechanism, a presser foot, a ruffling mechanism including a ruffling member, means for moving said ruffling member laterally, downwardly and forwardly, whereby the operative end of said ruffling member is placed in close proximity to front end of said presser foot, so that the ruffles in the fabric will be held by said presser foot until stitched.

45. In a sewing machine, the combination of stitch-forming mechanism, a ruffling mechanism including a ruffling member, a support for the ruffling member, a lever for moving said ruffling member laterally, and means acting on the ruffling member when at one extreme of its movement for giving it a movement in a direction across the line of lateral movement.

46. In a sewing machine, the combination of a ruffling mechanism including a ruffling blade, means for actuating said ruffling blade, a manually operated lever for giving said blade movements in two directions, and automatic means to return said blade to its initial position.

47. In a sewing machine, the combination of a ruffling mechanism including a ruffling member, means for actuating said ruffling blade, a pivoted manually operated lever for moving said ruffling member laterally, said member being provided with means whereby when said ruffling member is moved laterally it is also given a movement across the line of the lateral movement.

48. In a sewing machine, the combination of a ruffling mechanism, a ruffling member, a support for said ruffling mechanism mounted to swing on a vertical axis, a vertically reciprocating shaft, means carried by said support for operating said ruffling member, and means whereby said operating means may be connected to and disconnected from said vertically reciprocating shaft at the will of the operator.

49. In a sewing machine, the combination of a ruffling mechanism, a ruffling member, means to operate said ruffling member, said operating means being carried by a horizontal swinging support, a vertically reciprocating member, and means to reciprocate it, and connections between the vertically reciprocating member and said ruffler-operating means.

50. In a sewing machine, the combination of a ruffling mechanism including a ruffling member, a support for said ruffling mechanism including a horizontally swinging bracket, a vertically reciprocating member and means to reciprocate it, a forked member carried by said reciprocating member, and connections carried by said ruffler support for engaging said forked member for operating the ruffling member.

51. In a sewing machine, the combination of a ruffling mechanism including a ruffling member, means for supporting and operating said ruffling mechanism and its member, said supporting means being journaled upon a vertical axis to a stationary part of the machine frame, a vertically reciprocating member having its longitudinal axis co-incident with the vertical axis of said ruffling mechanism support.

52. In a sewing machine, the combination of a ruffling mechanism, a ruffling device, means to support and operate said device, means to move said device to and from the line of stitching, and means under the control of the operator for rendering said ruffling device ineffective including two bifurcated members 80 and 96 operating successively, so that as one is released the other is engaged.

53. In a sewing machine, the combination of a ruffling mechanism, a ruffling member, means to support and operate said ruffling member, said device including two bifurcated members 80 and 96 having their openings opposed to each other.

54. In a sewing machine, the combination of a ruffling mechanism including a ruffling member, means to operate said ruffling member including a vertically reciprocating member, means to adjust the extent of movement given to said vertically reciprocating member, and means whereby said ruffling member can be moved to and from the line of stitching and to render said ruffling member ineffective.

55. In a sewing machine, the combination of a needle, a ruffling mechanism including a ruffling member, means to move said ruffling member to and from the line of stitching, means to give said ruffling member its ruffling movement, said means including a reciprocating member for operating said ruffling member, and means to adjust its extent of movement, said means also including mechanism whereby the ruffling member can be disconnected and connected with the operating means at the will of the operator.

56. In a sewing machine, the combination of a ruffling mechanism including a ruffling member, means to operate said ruffling member including a main shaft, an eccentric mounted thereon, a reciprocating member, means located between the eccentric and the reciprocating member to adjust its extent of movement, means connecting said ruffling mechanism to the reciprocating member, said connecting means including devices, whereby the movement of the reciprocating member can be rendered ineffective.

57. In a sewing machine, the combination of a ruffling mechanism including a ruffling member, means to support said ruffling member, said means including an arm, a swinging member attached to said arm and normally held spring pressed, said swinging member being provided with a projection, and a cam for engaging said projection for moving said swinging member upon its pivot.

58. In a sewing machine, the combination of a ruffling mechanism, means to move said ruffling mechanism in and out of operative position with respect to the stitching mechanism, a lever under control of the operator for moving said ruffling mechanism into operative position, a locking device for said ruffling mechanism, said lever also controlling the locking device, and automatic means to restore said lever to its initial position.

59. In a sewing machine, the combination of a ruffling mechanism, a rocking lever under control of the operator, a stop to limit its extent of movement, and a second pivoted lever co-acting with said first named lever for moving said ruffling mechanism laterally.

60. In a sewing machine, the combination of a ruffling mechanism, a rocking lever under control of the operator, a second pivoted lever co-acting with said first named lever to move said ruffling mechanism laterally, said second lever also having means whereby said ruffling mechanism may be held in its lateral position.

61. In a sewing machine, the combination of a shiftable ruffling mechanism and means to shift it from one position to another, an automatic locking device for said ruffling mechanism, and means under the control of the operator to release said locking device, and automatic means to shift said ruffling mechanism one way when so released.

62. In a sewing machine, the combination of a ruffling mechanism, means to move said ruffling mechanism from inoperative to operative position or vice versa, an automatically operated locking device for said ruffling mechanism, automatic means under control of the operator to release said locking device, and automatic means to move said ruffling mechanism one way when so released.

63. In a sewing machine, the combination of a ruffling mechanism including a ruffling member, means under the control of the operator to move said ruffling member to and from the stitching line, means to give said ruffling member a second movement in another direction, said means under control of the operator including a locking device for holding said ruffling mechanism against displacement.

64. In a sewing machine, the combination of a ruffling mechanism including a ruffling member, means under the control of the operator to move said ruffling member to and from the stitching line, means to give said ruffling member a second movement in another direction, said means under the control of the operator including an automatic locking device for holding said ruffling member against displacement, and automatic means for moving said ruffling member in one direction.

65. In a sewing machine, the combination of a ruffling mechanism including a ruffling member, means under the control of the operator to move said ruffling member to and from the stitching line, said means including a lever pivoted between its ends, and automatic means for moving said ruffling mechanism in one direction.

66. In a sewing machine, the combination of a ruffling mechanism including a ruffling member, means under the control of the operator to move said ruffling member to and from the stitching line, said means including a lever pivoted between its ends, said lever having means to produce a second movement of the ruffling member across the path of travel of the lever.

In testimony whereof I affix my signature, in presence of two witnesses.

JAMES R. MOFFATT.

Witnesses:
C. McNEIL,
A. B. CLOTHIER.